United States Patent
Weiser (10) Patent No.: US 12,504,618 B2
(45) Date of Patent: Dec. 23, 2025

(54) MODULAR ARTICULABLE IMPACT-PROOF VISION SYSTEM

(71) Applicant: SCHOTT AG, Mainz (DE)

(72) Inventor: Stefan Weiser, Rosbach (DE)

(73) Assignee: SCHOTT AG, Mainz (DE)

( * ) Notice: Subject to any disclaimer, the term of this patent is extended or adjusted under 35 U.S.C. 154(b) by 534 days.

(21) Appl. No.: 17/811,579

(22) Filed: Jul. 8, 2022

(65) Prior Publication Data

US 2023/0019603 A1    Jan. 19, 2023

(30) Foreign Application Priority Data

Jul. 8, 2021    (DE) ...................... 10 2021 117 703.0

(51) Int. Cl.
*G02B 23/26*    (2006.01)
*G02B 23/24*    (2006.01)

(52) U.S. Cl.
CPC ........... *G02B 23/26* (2013.01); *G02B 23/243* (2013.01); *G02B 23/2453* (2013.01)

(58) Field of Classification Search
CPC ...... G02B 23/08; G02B 23/26; G02B 23/243; G02B 23/2453; F41H 5/266; B63G 8/38
See application file for complete search history.

(56) References Cited

U.S. PATENT DOCUMENTS

| | | | |
|---|---|---|---|
| 815,657 A * | 3/1906 | Swasey | G02B 23/08 359/402 |
| 2,130,006 A * | 9/1938 | Gundlach | F41G 1/40 359/405 |

(Continued)

FOREIGN PATENT DOCUMENTS

| | | |
|---|---|---|
| CN | 110988893 | 4/2020 |
| DE | 2740456 | 3/1979 |

(Continued)

OTHER PUBLICATIONS

Alex Maldonado, Large Periscope System, 2009, pp. 1-69 [online], [retrieved Oct. 3, 2024], retrieved from the Internet <URL: https://wp.optics.arizona.edu/optomech/wp-content/uploads/sites/53/2016/11/final_report_maldonado.pdf>. (Year: 2009).*

Difference Between Torque and Torsion, 2011, pp. 1-2 [online], [retrieved Oct. 4, 2024], retrieved from the Internet <URL: https://www.differencebetween.com/difference-between-torque-and-vs-torsion/>. (Year: 2011).*

(Continued)

*Primary Examiner* — Thomas K Pham
(74) *Attorney, Agent, or Firm* — Ruggiero McAllister & McMahon LLC (57) ABSTRACT

A modular viewing device for observation through a wall of a protected space is provided. The device includes a distal module with an objective lens, a proximal module having a movable light guide, a connection unit having with a first coupling device, and a rotatable bearing. The first coupling device releasably couples, optically and mechanically, the proximal module to the connection unit so that an image captured by the objective lens is directed to and transmitted by the image guide. The rotatable bearing rotatably mounts the distal module on a side of the connection unit opposite to the proximal module so that the distal module is rotatable relative to the proximal module and the connection unit is mountable on the wall. The rotatable bearing has an articulation device configured to allow articulation of the rotatable bearing by an observer looking at the exit end.

16 Claims, 5 Drawing Sheets

(56) References Cited

U.S. PATENT DOCUMENTS

| | | | | |
|---|---|---|---|---|
| 2,173,192 | A | * | 9/1939 | Williams .............. G02B 23/08 114/340 |
| 3,217,588 | A | | 11/1965 | Chitayat |
| 3,229,577 | A | * | 1/1966 | Ellinger ................ G21C 17/08 976/DIG. 359 |
| 3,256,387 | A | * | 6/1966 | Beste .................... G02B 23/08 359/402 |
| 3,801,187 | A | * | 4/1974 | McMichael .............. B60R 1/10 D16/132 |
| 4,110,011 | A | * | 8/1978 | Tausch ................... F41H 5/266 359/857 |
| 4,141,624 | A | * | 2/1979 | Siegmund ............. G02B 6/065 359/557 |
| 4,227,479 | A | * | 10/1980 | Gertler .................... B63G 8/42 114/244 |
| 4,621,618 | A | * | 11/1986 | Omagari ............. A61B 1/0052 600/152 |
| 4,787,725 | A | * | 11/1988 | Preussner ............. G02B 23/08 359/405 |
| 5,156,141 | A | * | 10/1992 | Krebs ................ G02B 23/2476 600/112 |
| 6,311,424 | B1 | * | 11/2001 | Burke ...................... F41G 1/40 89/203 |
| 8,184,151 | B2 | * | 5/2012 | Zombo .................. G02B 23/26 385/116 |
| 2002/0126959 | A1 | | 9/2002 | Keselman |
| 2014/0185138 | A1 | | 7/2014 | Sklarek |
| 2019/0265459 | A1 | * | 8/2019 | Hirata .................. A61B 1/0669 |
| 2020/0225006 | A1 | * | 7/2020 | Engels ................... G02B 23/08 |
| 2020/0386981 | A1 | * | 12/2020 | Weiser ................... G02B 23/08 |
| 2022/0133130 | A1 | * | 5/2022 | Bob ........................ A61B 1/31 600/150 |

FOREIGN PATENT DOCUMENTS

| | | | |
|---|---|---|---|
| DE | 3235998 | | 3/1984 |
| DE | 3940300 | A1 * | 11/1990 |
| DE | 10253477 | | 4/2004 |
| DE | 202012000112 | | 8/2012 |
| DE | 102011100494 | | 11/2012 |
| DE | 102019115146 | | 12/2020 |
| EP | 1467237 | | 10/2004 |
| EP | 1467237 | A1 * | 10/2004 ............. F41H 5/266 |
| KR | 20160094013 | A * | 8/2016 ............. G02B 23/08 |

OTHER PUBLICATIONS

An Optical Believe It or Not: Key Lessons Learned Technical Event, 2012, pp. 1-114 [online], [retrieved Oct. 1, 2024], retrieved from the Internet <URL: https://www.google.com/url?sa=t&rct=j&q=&esrc=s&source=web&cd=&cad=rja&uact=8&ved=2ahUKEwiH_O-s-e2IAxWgD1kFHUvnC7Y4HhAWegQIOhAB&url=...89978449>. (Year: 2012).*

Miquel Massot-Campos et al., Optical Sensors and Methods for Underwater 3D Reconstruction, 15 Sensors 31525-31557 (2015). (Year: 2015).*

M. Siddique et al., Optical Design of a Rotating Eyepiece Telescope, (2016), pp. 1-8 [online], [retrieved Oct. 1, 2024], retrieved from the Internet <URL: https://iopscience.iop.org/article/10.1088/1757-899X/146/1/012004/pdf#:~:text=A%20periscope%20is%20an%20optical%20instrument%...viewing%20of>. (Year: 2016).*

Danielle Collins, Rotary Bearings: Summary of Types and Variations, 2018, pp. 1-11 [online], [retrieved Sep. 29, 2024], retrieved from the Internet <URL: https://www.motioncontroltips.com/rotary-bearings-types-and-variations/>. (Year: 2018).*

Skater Scope Recommended Lenses, 2021, pp. 1-7 [online], [retrieved Oct. 1, 2024], retrieved from the Internet <URL: https://www.pstechnik.de/tpl/download/SKATER_Scope_recommended_lenses_20220111_web.pdf>. (Year: 2021).*

Kenjiro Obara et al., Design and Development of In-vessel Viewing Periscope for ITER (International Thermonuclear Experimental Reactor), 1999, pp. 1-96 [online], [retrieved Apr. 22, 2025], retrieved from the Internet <URL: https://inis.iaea.org/records/wxk7v-2rp07>. (Year: 1999).*

* cited by examiner

MODULAR ARTICULABLE IMPACT-PROOF VISION SYSTEM

CROSS REFERENCE TO RELATED APPLICATIONS

This application claims benefit under 35 USC § 119 of German Application 10 2021 117 703.0 dated Jul. 8, 2021, the entire contents of which are incorporated herein by reference.

BACKGROUND

1. Field of the Invention

The invention relates to a modular viewing device for observation from protected rooms or in protected rooms, where no direct line of sight is present due to a separating wall, so that there is no direct line of sight.

2. Description of Related Art

For optical image transmission over a distance, without a direct line of sight or through a separation of a critical environment and a non-critical environment, an image-based and movable, or, respectively, articulable area- and room-monitoring is typically used, which, for example allows a view around a corner. Different shapes and designs of image guides are often used here.

Such image guides are used, for example, for vision systems for application in vehicles. On the one hand, they are used for emergency operation, such as in the event of a failure of the electro-optical systems, or just as an optical device for the identification of objects, people, or animals and on the other hand, they are used for monitoring the surroundings of the vehicle, in particular of optical monitoring the sides of the vehicle. Other applications, for example for the special features of the driver's position, such as a view to the front and to the side, side view and as a camera-"extension" are also possible. In addition to vehicles, flexible and rigid image guides of this type are also used in industry, energy, science, as well as aviation and shipping.

In the safety-related or safety-relevant environment, in particular also for the security or safety of people and/or rooms, in particular periscopes are used for protected short-range monitoring from the interior of a protected room into an unprotected external environment. This enables potential dangerous situations to be identified quickly. In an industrial environment, periscopes may be used, for example, to look into protected rooms from the outside. This is particularly advantageous if digital vision systems, such as electronic cameras cannot be used within the protected room due to special conditions, for example in magnetic-field-chambers and other protected chambers, in which the use of cameras and electric bogies is not permitted due to magnetic fields or spark risks but a monitoring of an area also along the walls of the room is necessary.

DE 10 2011 100 494 A1 and DE 20 201 2000 112 U1 relate, for example, to a rigid vision system consisting of fiber rods, which displays an image covering a field of view of 60° to 180° with up to three lenses thus via the image-conducting fibers through several housing plates into a protected room and onto an eyepiece lens. The problem, however, is the design based complex and therefore very costly integration of lenses, prisms and fiber rods, as well as the physical restrictions to a given starting angle of view, since otherwise, there would be no view, which may not always ensured, especially when driving off-road or when using it inside the vehicle. With such vision systems, the fixed positions of the lenses may also lead to blind spots if, for example, the fields of view of the lenses do not overlap sufficiently so that a continuous observation of the forefield is not possible.

The mere optical monitoring of the near field by such rigid vision systems also allows only a partial view, which is largely defined by the width of the design as well as the position of the user, as well as the lenses at the ends of the fiber rods. A weakening of the outer shell by means of a breakthrough also represents a risk factor in the overall protection concept of the vehicle. Furthermore, monitoring in a wider field of up to 180° may not possible due to the angled design.

Other solutions, such as rotating periscopes for an orientation in an unprotected area or identification of objects therein using optical tunnels and deflections with mirrors are correspondingly flat and heavy, and are usually too large and bulky, for example, for use in a room with limited space, such as in particular an armored vehicle. The design of the periscope, in particular rigid periscopes, may not allow to focus fixed spots in the terrain while driving, as well as a monitoring along the vehicle in order to protect in the immediate vicinity.

Finally, the use of the periscope, in particular a rigid periscope, especially when in motion, is not only associated with visual impairments, but also with the risk of injury, since the user's head and especially the face and eyes of the user should be close to the corner mirror and a targeted, trackable view on, for example, individual spots in the terrain is not possible. Against this background, for example regarding an impact or penetration protection concept, also a fixed positioning in relation to the corner mirror is not permitted and limits its usability. In addition, the use of the generally fixed concept of the covered and thus protected view on which the corner mirror is based on, is only applicable in, or rather together with the vehicle. Thus, the application of a fixed design is limited or restricted to the application for vehicles.

Viewing modules, such as for example, a periscope consisting of an extendable tube with mirror elements are limited in their usability compared to flexible, adjustable fiber optic image guides, require space due to their rigidity and at the same time limiting mobility in a closed room and also cannot be used in connection with angle mirrors inside the vehicle and under closed flaps or hatches.

Since the use of rigid fiber rods or periscopes with corner mirrors is associated with many disadvantages, more flexible fiber optics may also be used. In order to reduce the damage to optical systems caused by vehicle vibrations, EP 1 467 237 A1 describes, for example, a periscope for an armored vehicle with a purely optical channel for transmitting an image, wherein a periscope head is rotatably mounted about its vertical axis and may be rotated as often as desired, and the optical channel comprises an image guide with optical fibers, so that transmitted vibrations of the vehicle have a reduced influence on the image quality of the image provided by the optical channel.

However, it is disadvantageous that the image guide is exposed to torsional forces due to rotations, which in the medium term can cause damage to the individual fibers and thus again reduce the image quality. Further disadvantageous is that an observer should take a fixed position in order to be able to see the image transmitted by the image guide. Therefore, the observer's position is not variable, as a result of which safety risks can arise, in particular while driving, and permanent monitoring of the surroundings is made more difficult, since the image transmission to the observer is disturbed by vibrations.

DE 32 35 998 A1 and DE 102 53 477 A1 present a viewing means, with which an observer is able to monitor the outside from closed or protected rooms, in particular armored vehicles. It is proposed to spatially separate a visual exit from a visual entrance of a viewing means in order to achieve that the positioning of the passengers or observers in an armored vehicle can be optimally selected. This spatial separation is made by means of a glass fiber bundle between the visual exit and the visual entrance of the viewing means. The fiber optic bundle is equipped with a lens unit at the visual exit and an eyepiece unit at the visual entrance. The fiber optic bundle is flexible, at least in some areas.

A major disadvantage of this solution, however, is the limited field of view, caused by an immovable lens. To counter this problem, DE 27 40 456 A1 describes a device for viewing out of closed rooms or for better and more comprehensive viewing out of partially open rooms, with one or more glass fiber optics to visually connect the interior with the outside. Thereby, the active end of the glass fiber optics can be rotated around a horizontal axis and the movement is remotely operated by the observer's head from the interior. However, this may lead to the vibration of the vehicle being transmitted to the observer, and the observer transmits these vibrations to the fiber optics with a delay via his head movement, which would then cause a rotation of the active end of the fiber optics. This way, a non-rotating field of view is hardly possible. The design shown in DE 27 40 456 A1 is disadvantageous in that, due to the design being open to the outside, foreign objects or substances may penetrate the rotating mechanism and damage it or, in the worst case, disable it.

SUMMARY

Therefore, it is an object of the invention, to overcome these disadvantages and to provide an advantageous, efficient, emission-free and safe solution for the use in both inside and outside by the combination of elements.

Some important aspects are also minimizing the breakthrough area and the associated risk minimization of the weakening of the vehicle shell, minimizing the weight and the required space—inside and outside—of a viewing device, integration into protectability of the observer against impacts or rather penetration.

Accordingly, the invention relates to a modular viewing device for observation out of protected rooms or into protected rooms. The modular viewing device comprises a distal module with at least one objective lens, a proximal module comprising at least one movable light guide wherein the movable light guide is designed substantially as a flexible fiber optical image guide, and a connection unit with a first coupling device for multiple times repeatable manually releasable optical and mechanical coupling of the proximal module to the connection unit, so that in the mechanically coupled state an image captured by the objective lens of the distal module is directed to an entry end of the image guide of the proximal module and is transmitted by it to its exit end.

The distal module is rotatably mounted on a side of the connection unit opposite to the proximal module by means of a rotatable bearing so that it is rotatable relative to the proximal module. The connection unit is preferably mountable on the wall that separates the protected room from the unprotected room. At least one device is provided for a mechanical, in particular manual, articulation or, respectively, movement of the rotatable bearing by an observer looking at the image at the exit end. In the context of this disclosure, the proximal module is understood to be the module at which the observer is viewing the captured image. Therefore, it can also be referred to as a vision module. The distal module, i.e. the module remote from the observer, is the module that captures the image. The distal module can therefore also be referred as an observation module.

The modular viewing device therefore enables images to be transmitted from a mechanically articulated small-area side of the lens of which an object is trackable, to a detachable eyepiece side that is connected to the flexible fiber-optic image guide. Therefore, the image is coupled into the modular viewing device at the side of the objective lens, wherein the decoupling of the image into the human eye or, for example, into a camera is made possible on the side of the eyepiece. Due to the modular connection concept of coupling units, the image guide that transmits the image to the eye may not only be used flexibly and stowed in the vehicle, but may also be used in parts outside of the vehicle due to the possibility of decoupling individual parts of the modular construction or design of the viewing device.

In a preferred embodiment, a housing is provided, which is in particular compact and/or profiled closely to the vehicle shell, and is preferably protected, which in particular at least partially and/or completely encloses the distal module or the distal module is already so compact and structurally protected, for example armored, so that it is per se encased accordingly. In this regard the term "complete" may refer to that the housing separates, in particular shields the distal module at least laterally and above the distal module from the external environment, so that no foreign bodies or objects from the external area of the housing can penetrate into the interior formed by the housing, and preferably to protect the distal module from external influences.

The objective lens may preferably be rotated within the housing by up to 90°, preferably up to 180°, preferably even up to 360°, so that the field of view in this angular range can be freely selected on at least one plane. The housing advantageously comprises a transparent, in particular disk-shaped element. The transparent element preferably comprises a transparency for visible light of up to 80%, preferably up to 90%, and preferably up to 99%. Likewise, the transparent element may also be transparent for UV and IR light, in particular near, medium and far infrared light, for example with regard to certain metrological purposes.

The aforementioned optical, articulable and protected viewing device enables close-range monitoring, which mechanically and optically at least allows a panning view at an angle of 180° without electricity and from a protected room. By using at least one flexible fiber optic image guide for image transmission, the user or observer is decoupled from the vehicle, so that movements of the observer are no longer transmitted to a movement of the objective lens, in particular of the field of view. The other way round, also a vibration of the lens or image guide is no longer transmitted to the observer, so that the field of view is mechanically decoupled from the observer and finally provides the observer with a flexible and portable viewing tool that can be used at other locations due to the first and/or a second coupling device. In other words, that is, the proximal module may be decoupled from the distal module and optionally provided with supplementary optical devices or modules, and may be used outside, for example, outside of a vehicle for viewing and observation purposes under safe or secure conditions.

In the context of the invention, the term "articulable" is understood as being movable. Thereby, it is, for example, possible, that individual components or modules of the viewing device are movable relative to one another. The proximal module may thus be movable, in particular rotatable, with respect to the distal module. At the same time, however, the exit end of the light guide may also be movable in different directions, in particular also simultaneously in at least two different spatial directions, with respect to the entry end, the objective lens, or the connecting unit.

The aforementioned decoupling also provides protection against impacts or penetration. In particular, by replacing an immovable periscope, which is fixedly mounted on the vehicle by the invention, an increased, improved safety of use is provided due to the no longer necessary close and fixed distance of the eyes to, especially when the vehicle is moving. In particular, the risk of injury to the eyes and head is minimized in that the observer can no longer be hit hard against a permanently mounted component of a periscope or another viewing device in case of jerky, in particular unexpected, movements of the vehicle.

Another advantageous effect is that the proximal module, in particular the flexible image guide, can at least partially be removed or decoupled from the connection unit, so that the proximal module may also be used at least partially outside the protected room. The proximal module may thus also be used outside the vehicle or remote from the connection unit, for example in order to be able to look outside into areas that are not directly visually visible or possibly unsafe or unsecured areas, for example around a corner.

The breakthrough area may advantageously be reduced to the diameter of a fiber-optic image conductor and thus a risk of a weakening of the vehicle shell can be minimized, and also further risk factors related to different protected rooms.

This concerns, for example, an increase in the impact- or penetration safety, as well as an interior tightness or generally a tightness of the room in which the module is installed or can be arranged or is mountable.

Since only one light guide or image guide, in particular in the form of a fiber optic cable, is necessary, which is preferably installed in the proximal module only, complex optical tunnel and mirror systems may be dispensed with, which means that the required space inside and outside as well as the weight of the viewing device is minimized. This ensures a minimization of the profile and thus the risk of damage, in particular towards the outside.

Preferably, the modular viewing device is designed as an optical conversion device for replacing a, in particular standardized periscope or corner mirror insert, in particular on a vehicle. Thereby, the connecting unit, preferably with a wall element is attachable to a wall that separates the protected room from the unprotected room, such that an opening of this wall is closeable, especially completely closable by the connection unit, in particular in a manner that it is impact protected. The term "complete" in the sense of the invention is to be understood as meaning that an opening in the wall is completely closed by the connection unit, but at least one opening inside the connection unit is provided, in particular in a wall element of the connection unit, for example for optical coupling of the distal module to the proximal module. The opening, in particular the image channel of the connection unit may therefore be closed by optical elements.

In the context of the invention impact- or penetration-protected or impact- or penetration-safe is understood as that an observer or a proximal side of the wall, in particular an interior of an impact or penetration protected room is, for example, protected against high dynamic and static mechanical loads, for example protected against the intrusion or penetration of objects with large mechanical impulses or impacts in a very short time. These may be, for example, shock waves or objects that have been accelerated by an explosion. In other words, the protected room is designed to be penetration-proof or an observer is accommodated in a penetration-proof manner.

However, it is also conceivable that impact-protected or penetration-protected represents a protection for observers who, for example, look into an impact- or penetration-protected room by means of the viewing device, while, for example, the pressure within this room increases due to an experiment, chemical and/or physical processes or other effects.

The modular viewing device may therefore also be attached as a device or as an optical conversion device to replace another device, for example preferably on standardized flanges, in particular CF flanges or windows that are arranged on or in reactors or other rooms or containers that can be used for chemical and/or physical purposes. Preferably, the modular, articulable viewing device is therefore also suitable for vacuum and is thus also regarded as being impermeable to gases and liquids.

Advantageously, the wall element may be configured such that only a small breakthrough in the wall is required in order to optically couple the distal module to the proximal module. In case of an existing breakthrough in the shell for a common periscope slot, such as is found, for example, in older vehicles, a correspondingly wider field of vision may be continuously covered by the rotatable light guide of the proximal module at a significantly smaller outer profile. The modular viewing device may therefore also be retrofitted or installed on older vehicles, wherein the wall element of the connection unit being firmly, in particular gas-tight, connected to the wall of the vehicle or room, preferably so that the size of the originally existing breakthrough in the wall is reduced to the size of the opening in the connection element.

In a preferred embodiment, the distal module in connection with the connection unit are designed as an attachment on a wall, which separates the protected space from the unprotected space. Thus, the viewing device may be placed in a simple manner on an existing opening or breakthrough in the shell of the vehicle or wall and connected to it, in particular in a gas-tight and/or impact-protected or penetration-protected manner. However, it is also possible that the modular viewing device or the connection unit, preferably in combination with the distal module, is designed as an attachment on, for example a hull roof, completely without a shell opening, so that a free positioning of the viewing device is realized. For this, it is now only necessary to drill a hole in the wall, whereby this hole only has to be adapted to the width or the diameter of the light guide, instead of a much larger opening, as would be required for a rigid periscope (for example with a corner mirror).

In other words, the modular viewing device may be gas-tight and/or vacuum-tight, in particular such that fluids that are harmful or dangerous for a user or observer do not penetrate into or out of the protected room to the observer.

In a preferred embodiment, the modular viewing device comprises at least one of the following features: the proximal module comprises a second coupling device, preferably to detachably couple it to the connection unit or to at least one objective lens, the proximal module comprises a preferably exchangeable eyepiece, the movable light guide of the proximal module is designed as a flexible cable, in particular as a fiber optical image guide, the proximal module comprises a multi-part light guide, wherein individual sections of the multi-part light guide being arranged in a row on the optical axis and being optically coupled to one another, the proximal module comprises an assignment unit with which the proximal module can be arranged on an object portable by the user, in particular at eye level, and/or can be assigned to an image acquisition unit.

Preferably, the modular viewing device or the proximal module comprises exactly one light guide, in particular a fiber-optic image guide. However, it is also conceivable that the proximal module comprises several light guides. Because the image guide is designed as a flexible cable, it is articulable such as desired, so that the user can move around in the vehicle or the room without having to interrupt the view through the light guide. The assignment unit allows the proximal module, in particular the image exit end of the image guide, to be attached to glasses or headgear, such as a helmet, for example, so that the user's hands remain free. The assignment unit may therefore comprise, for example, a locking device, a screwing device or a plug-in unit for a detachable connection to the object portable by the user.

Preferably, the second coupling device is designed for multiple times repeatedly and manually, in particular mechanically releasable coupling to the connection unit or to at least one lens. This way, the proximal module, preferably in combination with the articulable, in particular flexible image conductor can be coupled to the connection unit or decoupled from the connection unit as often as desired, in particular with single hand operation and/or without the use of other tools. Accordingly, it is provided, that the proximal module can be decoupled from the connection unit, in particular from the first coupling device. Likewise, a lens may be optically and mechanically coupled to the second coupling device, in particular to the image entry end of the light guide, preferably so that the user can use the distal module in the outside area and in combination with an optical device, for example an exchangeable objective lens.

With regard to its resolution performance, the selection of the objective lens is advantageously adapted to the resolution and configuration of the light guide and/or the eyepiece or an electronic image-capturing device connected to the exit end. For example, so-called C-mount lenses are known, that is to say lenses that comprise a connector according to the C-mount standard. Preferably, these lenses exhibit a resolution of more than 75 LP/mm or even more than 150 LP/mm. Therefore, these lenses can be used very well in combination with the aforementioned fiber optic image guide. Of course, other objective lenses are also possible and usable, for example common industrial lenses or other objective lenses developed for special applications.

An eyepiece may be provided at the image exit end of the light guide, which may also be rotated and/or exchanged by means of appropriate means, for example rotating, screwing, or plug-in devices. Thus, the user remains flexible with regard to the use of the vision device and his visual acuity.

In a preferred embodiment, it is therefore also provided, that a camera module may be arranged on the distal module or at the image exit end of the light guide, in particular for digital acquisition of images transmitted through the light guide. This enables an acquisition of images and videos, as well as a wireless transmission to a central monitoring point.

It may also be provided, that the light guide is designed a multi-part light guide. In this case, the light guide or the image guide comprises a plurality of sections that are optically connected one behind the other, and in particular optically and mechanically connected to one another. These sections can be connected to one another, for example, via coupling devices. This way, it is possible that individual sections may be removed and thus the light guide can be shortened as a whole, so that the load for use outside the vehicle or the protected room is reduced. The light guide thus extends from an image entry end, at which a coupling device is preferably arranged, to an image exit end, at which an eyepiece and/or a camera is arranged. Thereby, the eyepiece is provided to be designed as a monocular or binocular. The lens and/or the eyepiece may be arranged at the light guide such that the objective lens and/or the eyepiece are rotatable with respect to the light guide.

In a further embodiment, it is provided, that the distal module comprises two or more light guides so that, for example, one light guide may be connected to a camera and another light guide is available for a user.

It is also advantageous if the modular viewing device comprises at least one of the following features: the distal module (10) comprises a preferably exchangeable objective lens (11), the distal module (10) comprises a light deflecting element (13), in particular designed as a prism or mirror arrangement, and/or at least one mirror element for optically coupling the image captured by means of the objective lens (11) into the connection unit (20) and/or the proximal module (40), the distal module (10) comprises a pivoting and/or tilting device for pivoting or tilting the objective lens (11) and/or the light deflecting element (13) and/or the mirror, the objective lens (11), the light deflecting element (13) and/or the mirror is arranged such that it is pivotable or tiltable in a direction perpendicular to the optical axis of the lens (11), the distal module (10) is arranged to be rotatable by an angle of at least 90° or larger.

Preferably, the distal module is designed such that it is arrangeable on the rotatable bearing of the connection unit. Accordingly, it is provided, that the objective lens, the light deflecting element and/or the mirror may be mounted pivotable or tiltable in a direction perpendicular to the optical axis of the objective lens and perpendicular to the axis of rotation of the rotatable bearing by the pivoting and/or tilting device. In other words, the lens, the light deflecting element and/or the mirror may be moved in two directions, which in particular are perpendicular to one another. This way, the field of view can be expanded or the position of the field of view predetermined by the objective lens can be changed by the movement. In order to realize the pivoting or inclination, the lens and/or the light deflecting element or the mirror may be arranged on a tilting table or another tilting device. This tilting device can then be operated via means for transmitting mechanical movements, in particular mechanically, and preferably remotely controlled from the side of the wall facing the observer.

An image may be captured by means of the objective lens and directed onto the light deflecting element, a mirror element, or even directly onto the connection unit or the image entry end of the light guide of the proximal module. A coupling device is provided at the distal module in order to at least mechanically couple the objective lens to at least one component of the distal module.

It is also conceivable that the modular viewing device comprises at least one of the following features: the connection unit comprises an opening to optically couple the proximal module with the distal module, the opening for optical coupling comprises an optical element, in particular a safety glass or optical lenses, the opening is arranged in a wall element which can be fastened to a wall which separates the protected room from the unprotected room, or which is part of this wall.

The opening is preferably designed as an image channel, wherein the image captured by the objective lens is directed from the distal module onto the opening of the connection unit, in particular without loss. By means of at least one optical lens, the image may then be transferred through the opening onto the image entry end of the light guide. Thereby, the lens or another optical element may be arranged within the opening, on the rotatable bearing, or in front of the opening with respect to the direction of the image transfer, but in particular may be arranged downstream of the objective lens, preferably also the light deflecting element or mirror. In other words, the lens is arranged between the objective lens and the image entry end of the light guide.

Due to the focal length of the objective lens, the image is directed onto the image entry end of the light guide. The lens makes it possible to transfer the entire image and with high resolution to the image entry end of the light guide. The lens or another optical element may also change the focal length. Likewise, a further optical element, such as a further lens, may also be provided between the objective lens and the image entry end.

In order to ensure, for example, impact protection or to increase the safety of the user, a safety glass may be arranged in the opening so that the opening can be closed, for example, in a gastight manner and/or strongly accelerated objects cannot penetrate to the user. It is therefore also provided to connect the wall element to the wall, in particular in a gas-tight manner, for example to weld or screw the wall element to the wall.

It may be provided, that the modular viewing device has at least one of the following features: the rotatable bearing, by which the distal module is mounted rotatably with respect to the proximal module, is arranged on the connecting unit, in particular on the wall element, as part of the device for mechanical, in particular manual, articulation, the connection unit comprises an operating unit with which at least the rotatable bearing is mechanically remotely controllable, the operating unit comprises an assembly device for connecting the operating unit to the movable light guide.

It is also provided, that the distal module is connected to the connection unit, wherein the distal module being rotatably mounted with respect to a wall element of the connection unit. Due to the rotatable bearing, the distal module can therefore also be mounted rotatably with respect to the wall element, in particular with respect to the wall, for example of the vehicle. Ideally, the rotatable bearing is remotely controllable from a side of the wall facing the observer, in particular a side of the wall opposite the distal module. Thereby, the operating unit may also be arranged on the side of the wall opposite the distal module. This way, the device for mechanical articulation may safely be remotely controlled from a protected side of the wall by the observer or a user.

It is also provided, that by means of the device for manual mechanical articulation, at least one of the movements of a rotation or inclination of the distal module or at least one of its components can be carried out by operating an operating unit, which is arranged on the proximal module. In other words, by means of the device for manual mechanical articulation, the distal module or the lens is rotatable and/or tiltable. Advantageously, individual components of the device for manual mechanical articulation can be arranged at the wall element. In particular, components of the device for manual mechanical articulation may be arranged on the side of the wall element facing the observer, wherein these components being arranged on the protected side of the wall or of the wall element and are thus also being protected from external mechanical stresses.

Preferably, the operating unit may be arranged at or assigned to a position that is easily accessible to the observer. It is therefore provided, that the operating unit can be arranged on the light guide or image guide by means of the assembly device. Accordingly, in addition to the image guide, some components of the device for manual mechanical articulation may also be designed flexibly. An observer can thus move freely and still has the control unit within easy reach. The operating unit is preferably designed as a setting wheel or lever so that an observer or user can operate it easily. The rotation and/or inclination may preferably be carried out continuously by means of the device for manual mechanical articulation.

In an advantageous embodiment the device for manual mechanical articulation comprises means for transmitting mechanical movements which are transmittable by the operating unit. Thereby, the mechanical movements being able to be translated into a rotary movement and/or a tilting movement. The observer can then use the operating unit to, in particular continuously, set or carry out the rotation and/or inclination of at least the objective lens, preferably the distal module through the means for transmitting mechanical movements.

It is advantageous, if the device for manual mechanical articulation comprises at least one Bowden cable for the transmission and/or translation of mechanical movements. In this way, the angle of rotation and/or angle of inclination of the distal module or lens can be set by means of the operating unit. Preferably, the Bowden cable is connected to the operating unit, for example to the setting wheel at one side. At the other side, the Bowden cable may be connected to a rotary element of the rotatable bearing, for example a turntable, which is assigned to the proximal module and which may be arranged on the side of the wall element facing the observer.

In other words, the rotary element of the rotatable bearing assigned to the proximal module is connected to the operating unit via a Bowden cable.

Preferably, the mechanical movement of the operating unit caused by the observer or user can be transmitted to the rotary element assigned to the proximal module, for example via idlers. Preferably, the idlers are arranged on the wall element. The Bowden cable, in particular flexible movement translators, for example bands or wires, are connected to the rotating element at two, preferably opposite, positions so that a rotation of up to 90° or more can be realized.

In one embodiment, the device for manual mechanical articulation at least comprises the rotary element assigned to the proximal module. Preferably, the device for manual mechanical articulation also comprises a rotary element assigned to the distal module, wherein the distal rotary element being arranged on the side of the wall or wall element opposite the rotary element, which is assigned to the proximal module. The distal and in particular, also the rotating element assigned to the proximal module may be designed as a turntable.

The device for manual mechanical articulation may also comprise a ball bearing. The ball bearing preferably comprises a plurality of balls, which are arranged between the wall element or the wall and the rotary element, which is assigned to the distal module. Thereby, it is provided, that the balls all have the same size in order to guarantee a smooth run.

It is provided, that the wall element and/or the rotary element assigned to the distal module comprise at least one, possibly also more than one, for example two, ball grooves. The ball grooves are preferably used to hold the balls and ensure that the balls do not roll outwards, for example, in case of vibrations of the vehicle.

The wall element may advantageously also comprise rotation limiters, wherein these rotation limiters can preferably be designed as at least partially annular recesses. The rotation limiters preferably run parallel to the ball grooves. The rotation limiters are preferably arranged between the opening of the wall element and the ball groove (s).

Preferably, the rotary element, which is assigned to the distal module and the rotary element, which is assigned to the proximal module are mechanically connected to one another, in particular so that the mechanical movement transferred by the operating unit is transmitted equally to both rotary elements. Thereby, the distally arranged rotary element and the rotary element assigned to the proximal module may be connected to one another via at least two mechanical connectors. It is therefore provided, that the mechanical connectors run through the rotation limiters, in particular through the recesses of the wall element. The rotation limiters may advantageously also serve as a guide for the connectors and, in particular, also provide a rotation stop for the connectors. The connectors can therefore also be designed as pin elements, which can be guided in the recesses in case of a rotation of the rotatable bearing.

Another embodiment provides, that the modular viewing device comprises two or more devices for manual mechanical articulation. Thereby, a device for manual mechanical articulation to move the rotatable bearing or to move at least one rotary element is provided. Another device for manual mechanical articulation can then be used to incline and/or pivot the distal module. In this case, for example a Bowden cable or flexible motion translator, respectively, may be fed through the connectors and/or at least one of the rotary elements, preferably through both rotary elements. It is provided that the rotary movement of the rotatable bearing and the tilting movement of the pivoting and/or tilting device are coupled to one another, for example by common motion translation elements, or are decoupled from one another by separate motion translation elements.

It is conceivable that the coupling device or the coupling devices, preferably also the operating unit, are designed as a bayonet-, screw-, flange- and/or plug-in system. Preferably, the operating unit comprises a plug-in or clamping device, with which the operating unit can be reversibly plugged or clamped onto the light guide. It is, however, also possible that the operating unit comprises a bayonet or screw system, with which the operating unit is reversibly or detachably mountable at the image exit end of the light guide.

Preferably, the first coupling device comprises an internal thread or an external thread, wherein the second coupling device comprises a thread complementary to the first coupling device. If, for example, the first coupling device comprises an internal thread, the second coupling device comprises an external thread, or vice versa. The second coupling device may accordingly comprise a clamp or a sleeve, which encompasses or surrounds the light guide.

It may therefore be provided, that the coupling device or the coupling devices are designed such that the movable light guide is rotatable independently of the coupling device or the coupling devices, such that the movable light guide is movable torsion-free. This is the case, for example, when the second coupling device is designed as a clamp or a sleeve. This way, the light guide may be rotated torsion-free within the clamp or sleeve, so that the light guide is not stressed by torsion and risks during image transmission are reduced.

At the same time, the first and second coupling device may also be designed as a plug-in or bayonet connection and in particular comprise a locking insert, a notch, and/or a spring holder. The complementary first or second coupling device accordingly comprises a pin or projection, which fits into the notch or the locking insert.

Another embodiment provides that the modular viewing device comprises an image amplifier or residual light amplifier. With a residual light amplifier, the observation span can be extended so that observation or use of the viewing device is not only possible in daylight, but also at night. Preferably, the residual light amplifier is arranged between the objective lens and the eyepiece. A positioning of the residual light amplifier is conceivable, for example, at the entry end or the exit end of the light guide.

In order to keep the use of the residual light amplifier as flexible as possible, provision is made for the residual light amplifier to be exchangeable, that is to say at any time to be detachably arranged between the lens and the eyepiece. For this purpose, the residual light amplifier maybe designed, for example, such that the residual light amplifier can be inserted as an optical element in the opening of the wall element. Most convenient, the residual light amplifier may simply be inserted into the viewing device, for example in the course of decoupling and recoupling the proximal module from/with the connection unit. Likewise, the residual light amplifier may also be arranged between the lens and the entry end of the light guide, for example when used outdoors.

Filter disks may be inserted at interfaces or at the coupling devices, in particular between the lens or objective and a lens holder. For use at night, for example, ND filters or gray filters may be provided in order to achieve an even darkening of the image. To avoid undesired optical effects, such as a Moiré effect, a low-pass filter may be provided.

It is advantageous if the light guide or the fiber-optic image guide is a high-resolution fiber-optic image guide and makes it possible, while the modular viewing device is in operation, to receive light beams from a light exit surface of the reversing light deflecting prism at the entry end and to transport the light beams to a location spaced apart therefrom, for example the exit end, at which a visualization for an operator, for example via an eyepiece, may take place.

Fiber-optic image guides are characterized by a large number of light guides or light-conducting fibers, which are in the same order at the input and output sides and wherein each fiber can transmit brightness and color information. The light may be transmitted by reflection at the transition between cladding and core within an optical fiber. In order to avoid a transfer of light between adjacent optical fibers, these are advantageously suitably protected. The number and size of the optical fibers determine the optical resolution of the image and thus the quality of the image transmission by the optical device.

The fiber optic image guide is therefore able to meet the requirements for a small cross-sectional area on the one hand and high resolution on the other hand in order to keep the opening in the wall that separates the protected room from the unprotected space as small as possible. Thereby, the diameter of an optical fiber determines the resolution of the transmitted image, wherein smaller diameters may enable a higher resolution.

Preferably, high-resolution fiber optic image guides with a small diameter of the individual optical fiber are selected for the invention, preferably with a diameter of the optical fiber of 12 µm or less, preferably 10 µm or less, more preferably 7 µm or less.

These individual optical fibers can be brought together to form a flexible or at least partially rigid bundle comprising a large number of such optical fibers. Such a light guide element or bundle may advantageously comprise at least 1,000, preferably at least 5,000, more preferably at least 10,000 optical fibers. For a high-resolution fiber-optic image guide, a large number of such bundles can in turn be brought together, so that a high-resolution fiber-optic image guide that is very suitable for the invention then comprises a large number of at least 10,000 optical fibers, preferably at least 100,000, preferably at least 200,000 and more preferably at least 400,000 optical fibers or even beyond. According to the invention, so-called "wound fiber bundles" are provided, in particular with glued fibers, preferably fibers glued together at the fiber ends.

According to the invention a suitable fiber optic image guide with, for example, 160,000 optical fibers with a diameter of the individual optical fiber of, for example, 10 µm may thus provide a resolution in a range of approximately 45 LP/mm (line pairs/mm), wherein a resolution of at least 25 LP/mm, preferably at least 30 LP/mm, more preferably at least 40 LP/mm, may already be sufficient for an application according to the invention.

Such a high-resolution fiber optic image guide is particularly well suited for the modular viewing device and offers excellent viewing possibilities, preferably in the near field and far range, in particular in the wide-angle observation range of 90° or more degrees, for example up to 105° or more. In particular, a swivel range of up to 180° (105°, 90°) and/or an inclination of up to ±30°, in particular in relation to a middle position, is provided, wherein the viewing device may preferably be inclined by up to 30° upwards and/or up to 15° downwards, or for example by up to 25° upwards and/or downwards by up to 10°. Angles of inclination between a range of −30° and +30° are also conceivable.

The cross-sectional area of the fiber-optic image guide, at least in a section of smaller cross-section, determines the size of the required opening in the wall or the wall element, which is to be provided in order to pass the image guide through the opening, wherein a cladding of the fiber-optic image guide should also be taken into account. Very small cross-sections of flexible fiber optic image conductors suitable for image transmission may be in a range from about $2*2$ mm$^2$=4 mm$^2$ or from a diameter of 1 mm and enable good observation during the day in the vicinity of the modular viewing device, in particular in the vicinity of the distal module. It is thus possible to reduce the opening in the wall or the wall element to a cross-sectional area of approximately this order of magnitude. The weakening of the structure of the protective shell can be considered minimal with such a small opening.

Of course, larger cross-sectional areas are also possible, which, for example, allow a corresponding cladding to be provided, but a size of the cross-sectional area of about $40*35$ mm$^2$=1,400 mm$^2$ should not be exceeded in order to keep the opening in the wall or the wall element as small as possible. The tolerable size of the opening naturally also depends on the type and material of the wall or the wall element itself, so that the selection of a suitable image-guiding element can be based on this on the one hand and on the other hand on the optical requirements, so that larger cross-sectional areas are also conceivable.

In principle, with regard to their external geometry, the number and the size of the individual optical fibers the fiber optic image guides can be configured and selected in a variety of ways according to the specified requirements.

Advantageously, the movable light guide and/or the modular viewing device has a high temperature resistance and, in a preferred embodiment, satisfies the relevant standards (e.g. defined and standardized as MIL-STD). The temperature resistance of the light guide and/or the modular viewing device is therefore preferably in a range from at least −20° C. to +100° C., more preferably from −55° C. to +125° C. in order to be able to be used even under extreme conditions, e.g. temperature and/or humidity. Such light guides are subjected to so-called damp-heat tests, for example. A damp heat test involves the application of constant moist heat to determine the suitability of products for use, storage and transport under conditions of high humidity. Cyclical moist heat is used to determine the suitability of products for use, transportation and storage in conditions of high humidity combined with cyclical temperature changes. The temperature and humidity conditions under constant moist heat are generally 30° C.±2° C./93%±3% (humidity), 30° C.±2° C./85%±3%, 40° C.±2° C./93%±3% and/or 40° C.±2° C./85%±3%. The test time is 12 hours, 16 hours, 24 hours and/or 48 hours, possibly several days. Cyclical moist heat is examined with a, for example, also multiple, 12 h+12 h cycle, i.e. a product or test item is first exposed to heated to between 40° C. and 50° C. at 90% to 96% humidity, then cooled to approx. −25° C. at a humidity of around 95%.

In a further embodiment of the invention, the movable light guide or the fiber-optic image guide may comprise further special optical fibers, for example so-called IR fibers. IR fibers within the meaning of the invention are designed to transmit electromagnetic radiation in the near-infrared or infrared range. This makes it possible that the optical device can also be used very well in the field of thermal image transmission.

In a preferred embodiment, the fiber-optic image guide may therefore also exclusively or additionally comprise IR fibers for the transmission of electromagnetic radiation in the near infrared range between 780 nm to 3,000 nm and/or in the infrared range above 3,000 nm.

For a good visualization of images, in particular also of thermal images, it is helpful if the attenuation of the modular viewing device is as low as possible, that is to say the transmission for electromagnetic radiation in the relevant wavelength ranges is as high as possible. The maximum attenuation of the light guide in the visible wavelength range of electromagnetic rays between 380 nm and 780 nm is therefore preferably at most 5 db/m, more preferably at most 3 db/m, most preferably at most 1 db/m. If IR fibers are used, the maximum attenuation in the near infrared range between 780 nm to 940 nm is likewise preferably at most 5 db/m, more preferably at most 3 db/m, most preferably at most 1 db/m. Preferably, this also applies to the wavelength range up to 3,000 nm and beyond, and/or to the ultraviolet wavelength range below 380 nm.

The objective is also solved by a proximal module for a modular viewing device, in particular a modular periscope for optical connecting two rooms separated by a wall and for an observation out of protected rooms or into protected rooms. The proximal module comprises at least one movable light guide in the form of a flexible image guide, an eyepiece and a second coupling device for a multiple times repeatable and manually releasable optical and mechanical coupling of the proximal module with a first coupling device of a connection unit of the modular viewing device or an objective lens wherein the first coupling device is complementary to the second coupling device of the proximal module. The movable light guide extends from in particular an entry end, which is arranged on the second coupling device, to in particular an exit end.

The proximal module for the modular viewing device preferably has at least one, preferably several of the aforementioned features with the aforementioned advantages.

The objective is also solved by a connection unit for a modular viewing device, in particular, a modular periscope for optical connecting two rooms separated by a wall and for an observation out of protected rooms or into protected rooms, comprising a wall element, a first coupling device for a multiple times repeatable and manually releasable optical and mechanical coupling of a second coupling device of a proximal module of the modular viewing device, wherein the second coupling device is complementary to the first coupling device of the connecting unit, and a rotatable bearing for mounting a distal module of the modular viewing device, and which is rotatable with respect to the wall element and the first coupling device, wherein the distal module can be arranged on a side facing away from the observer, in particular an opposite side to the first coupling device, and the first coupling device and wherein means for transmitting mechanical movements to the rotatable bearing are arranged on a side of the connection unit facing the observer.

The connection unit for the modular viewing device preferably has at least one, preferably several of the aforementioned features with the aforementioned advantages.

In other words, a direct coupling of the fiber optic image guide to or below the outer shell of the protected room, for example a hull roof, is possible with a rotatable objective lens holder by means of a coupling piece passed through a breakthrough, wherein the coupling piece is also a coupling adapter with a focal distance of the flexible image guide as well as a rotary handle with an orientation transmitter. The Bowden cable may be connected over a distance to an end sleeve of the flexible image conductor for rotating the coupling piece. The modular viewing device is therefore essentially usable at seats positioned at arm's length, for example near a tailgate or -ramp.

The modular viewing device may also comprise a fixed industrial format quick coupling adapter that can be rotated in accordance with the aforementioned swivel range for coupling and uncoupling flexible fiber-optic image guides with a corresponding end sleeve format. The modular viewing device with this rotatable objective lens holder may be used and operated underneath the housing using gloves, wherein the image guide is mechanically rotated inside— endlessly until a mechanical stop—and by means of a coupling piece, which is also a coupling adapter with a focal distance of the flexible image guide as well as a rotary handle with an orientation transmitter and the associated cable pull. The connected flexible image guide—also for removing and taking along when leaving the vehicle—may rotate itself up to 359° using existing known technology.

The modular viewing device is preferably used in at least one or more of the following areas.

Industry, energy, science as well as aviation and shipping, in particular in manufacturing, transfer and/or experimentation areas, for example the chemical or energy technological and -generating industry, Research environments in which, due to their peculiarities and effects, an optical, preferably articulated, local monitoring represents a functional and effective visualization option, for observation and monitoring out of protected rooms in the safety-related or safety-relevant environment when securing or for the safety of people in or outside of protected, in particular armored vehicles, for observation and monitoring out of or into protected, encapsulated and/or armored rooms or facilities, for example in the chemical and/or mechanical engineering environment.

In particular, the modular viewing device is used for zonally, preferably merely optical and/or currentless observation of an outdoor area out of a protected room with a wall that separates the protected room from the unprotected room, wherein the distal module is arranged outside the protected room on an exposed side of the wall, and the proximal module is arranged on a protected side of the wall. A currentless observation in the sense of this disclosure is meant to be a non-electric mode of operation, i.e. an observation achieved or performed without use of electric power, in particular without using electrical power for moving the optics, focusing and optical transmission through the viewing device.

The modular viewing device may also be used for zonally, preferably merely optical and/or currentless observation of an interior area of a room with a wall that separates an unprotected interior area of a protected room from a protected outside area, which is located outside the room, wherein at least the proximal module is arranged on the wall outside the protected room and the distal module is controlled on a side of the wall in the unprotected interior of the protected room.

It is also provided, that the proximal module and the distal module are used separately from one another, in particular the proximal module can be used preferably with an objective lens, which is connected to the first coupling device.

The objective is also solved by an observation station or vehicle, preferably by a protected observation room with an observation station or an armored vehicle with a wall that separates the protected room from the unprotected space, wherein the observation station or vehicle comprises a modular viewing device according to at least one of the aforementioned embodiments.

The observation station or vehicle preferably comprises a wall with at least one opening with a cross-sectional area of less than 500 mm$^2$, preferably less than 400 mm$^2$, more preferably less than 300 mm$^2$, most particularly preferably less than 200 mm$^2$ or even less than 150 mm$^2$ or less than 100 mm$^2$, wherein an image transmission merely occurs optically through this opening and by means of the modular viewing device, in particular according to the aforementioned description, and wherein preferably the distal module is arranged outside the protected room on an exposed side of the wall, and/or the proximal module is arranged on a protected side of the wall. With such a small cross-sectional area of the opening, the risk of an intruding or penetrating object is kept very low, as a result of which the protection provided by the wall is further increased.

Ideally, the movable light guide of the observation station or the vehicle is a high-resolution fiber optic image guide.

The objective is also solved by a method for preferably merely optical and/or currentless observation of an area out of or into a room protected by a wall, preferably comprising a modular viewing device according to any of the aforementioned embodiments. Thereby, at least one modular viewing device is provided, which comprises a distal module with at least one objective lens, a connection unit and a proximal module comprising at least one movable light guide. The movable light guide is designed substantially as a flexible fiber optic image guide, wherein the distal module is designed such that it is articulable so that a swivel range of up to 180° (105°, 90°) and/or an inclination range of up to ±30° is coverable, wherein the viewing device is tiltable, preferably by up to 30° upwards and/or downwards by up to 15°, or preferably upwards by up to 25° and/or downwards by up to 10°. An image captured by the objective lens of the distal module is directed to an entry end of the image guide of the proximal module and transmitted by it to its exit end.

The connection unit preferably has an opening, which is preferably designed as an image channel. In particular, the image of the distal module captured by the objective lens can be directed to the opening of the connection unit, in particular without loss. The image can be transmitted further through the opening or the image channel to the entry end of the image conductor of the proximal module, which in turn preferably forwards the image to the exit end.

BRIEF DESCRIPTION OF THE DRAWINGS

The invention is explained in more detail below with reference to the enclosed figures. In the figures, the same reference symbols denote the same or corresponding elements.

DETAILED DESCRIPTION

Figure 1:
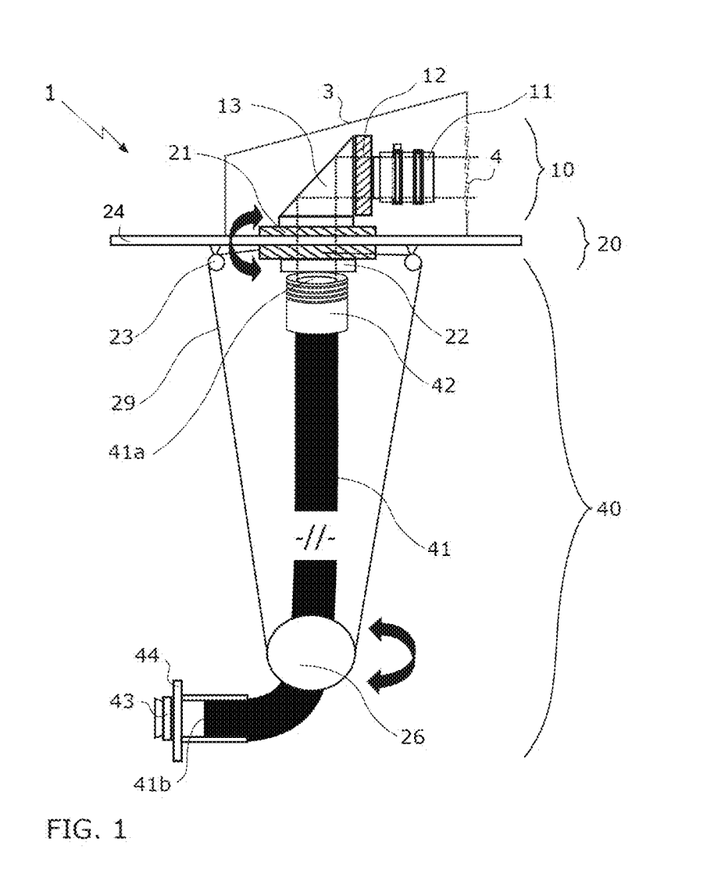
FIG. 1: Schematic cross-sectional view of the modular viewing device.

FIG. 1 shows the modular viewing device 1 in a schematic cross-sectional view.

The modular viewing device 1 comprises a housing 3 with a disk-shaped element 4, a distal module 10, a connection unit 20 and a proximal module 40, wherein these components are preferably arranged in the image guidance direction from the one disk-shaped element 4 to an eyepiece 43, in particular in the aforementioned order.

The housing 3 is arranged on a wall or wall element 24, which separates a protected room from an unprotected space, and is designed such that it completely surrounds the distal module 10. Thereby, the disk-shaped element 4, which may also be designed as a safety glass, is arranged on the housing 3 such that an objective lens 11 can be arranged behind the disk-shaped element 4 and in an interior space formed by the housing 3. In other words, the distal module 10 is enclosed by a metal housing according to the desired protection classification (for example according to MIL-STD) and/or has a field of view opening designed according to the swivel range, which is closed by a disk-shaped element 4, for example a cover disk, preferably with variation range including protective effect, protective coating and/or filter effect.

The objective lens 11 may be assigned to the distal module 10. Thereby, a light deflecting element 13 or a mirror element, which is also assigned to the distal module 10, is arranged downstream of the objective lens 11, wherein the light deflecting element 13 or a mirror element in particular transmits the image captured by the lens 11 to an entry end 41a of a light guide 41 of the proximal module 40. Preferably, the light deflecting element is designed as a prism or a mirror arrangement or comprises at least one prism or a mirror arrangement. The focal length of the objective lens 11 is preferably selected such that the image is sharply imaged on the entry end 41a of the light guide. Because the light guide is preferably designed as a fiber optic image guide, the image is transmitted to the exit end 41b, wherein, in particular, the eyepiece 43 may be arranged at the exit end 41b.

The distal module comprises the objective lens 11, an objective lens holder 12, the light deflecting element 13 and/or a further optical element, for example a lens, which is not shown in FIG. 1. The distal module 10 is preferably arranged within the housing 3 and in particular on a rotatable bearing 21 that may be assigned to the connection unit 20.

The connection unit comprises the rotatable bearing 21, a first coupling device 22, a device for mechanical articulation 23, a wall element 24, which is not shown in FIG. 1, an operating unit 26, an assembly device 27 and/or means for transmitting mechanical movements, in particular in the form of a Bowden cable 29.

The first coupling device 22 is designed such that a second coupling device 42, which is designed complementary to the first coupling device 22 of the proximal module 40 can be released repeatedly and in particular manually many times, preferably without auxiliary tools and only by hand of an observer. In order to be able to completely detach the proximal module 40 from the connection unit, the operating unit 26 is also designed such that it can be repeatedly and in particular be detached manually many times from the light guide 41, preferably without auxiliary tools and only by hand of an observer.

The proximal module 40 comprises at least one movable light guide 41 with an entry end 41a and an exit end 41b, a second coupling device 42 for coupling to an objective lens 11 or the first coupling device 22, an eyepiece 43, which is preferably arranged at the exit end 41b and/or an assignment unit 44, which can be connected, for example, to a helmet or glasses.

By means of the design of an articulable structure at angular dimension depending on the position and housing for a freely selectable lens setting, the flexible fiber-optic image guide can be connected to the rotatable bearing 21 with a deflecting mirror or light deflecting element 13 and a fixed lens holder 12, wherein the freely selectable lens setting comprises a lens table or rotatable bearing 21 with the lens holder 12 and the deflecting mirror, or the light deflecting element 13. By means of tensile forces and at least one Bowden cable 29 with a stop, turning ranges up to 180° can be mechanically covered from a distance and monitored by means of an objective lens 11. Because of the modular design, different objective lenses 11, for example wide-angle-, zoom-, and other lenses may also be used and simply exchanged according to the situation, and thus the necessary fields of view can be covered. In addition to optical eyepieces, cameras may also be connected at the eyepiece side.

Figures 2A, 2B:
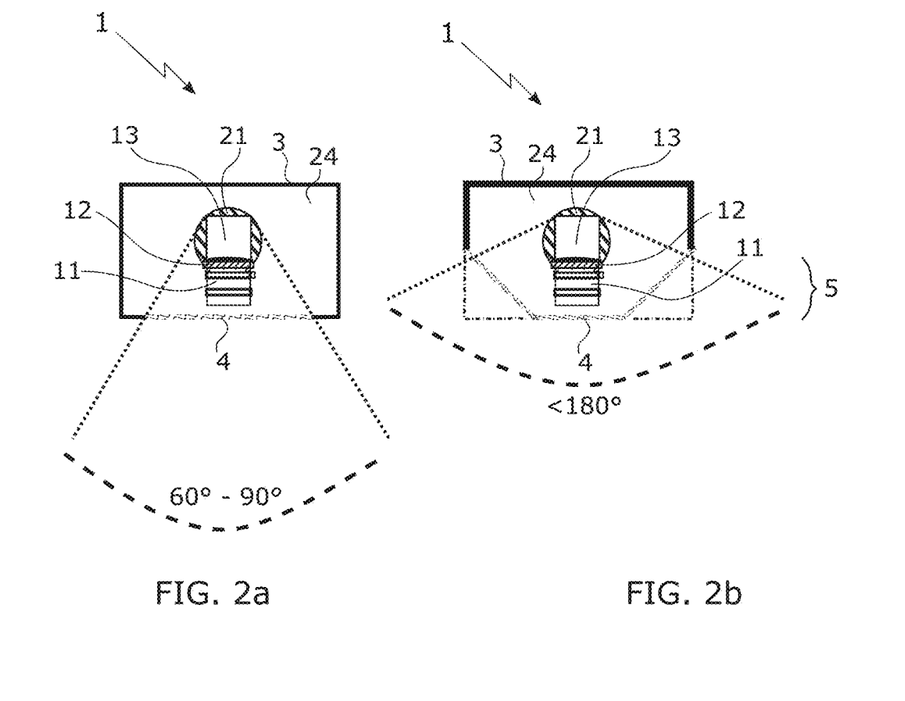
FIGS. 2a and 2b: Schematic depiction of the field of view in two different versions of the housing.

In FIGS. 2a and 2b two schematic fields of view are shown, wherein different versions of the housing 3 may be implemented. In both cases, the wall element 24 on which the housing 3 is arranged has the same basic shape. A lens holder 12 of the distal module 10 built into the housing area is freely movable in the horizontal plane by the rotatable bearing 21, and can in particular be rotated in a swivel range of 90° and/or covers a field of view of up to 180°. A special construction, for example for corner positions, may also cover a field of view of up to 270°. Thereby, objective lenses 11 with a field of view between 60° and 90° are provided. A special construction up to 105° is possible. In particular, a preferably permanently attached orientation sensor is also provided.

On the left side of the drawing a housing 3 with a rectangular basic shape is shown. The disk-shaped element 4 may be shaped planar or curved and/or is arranged in front of the objective lens so that a field of view in the range from 60° to 90° can be achieved. On the right side of the drawing also a housing 3 with a rectangular basic shape is shown, which, however, comprises a trapezoidal section 5. This trapezoidal section 5 may be formed by the disk-shaped element 4. This way, an enlarged field of view of up to 180° is possible when the objective lens 11 is rotated. It is therefore also possible that the housing 3 and/or the disk-shaped element 4 have other basic shapes than those shown in FIGS. 2a and 2b. A triangular, oval, round or also polygonal basic shape may also be conceivable, for example, or a basic shape with sections of different shapes so that the field of view can be adapted.

Figure 3A:
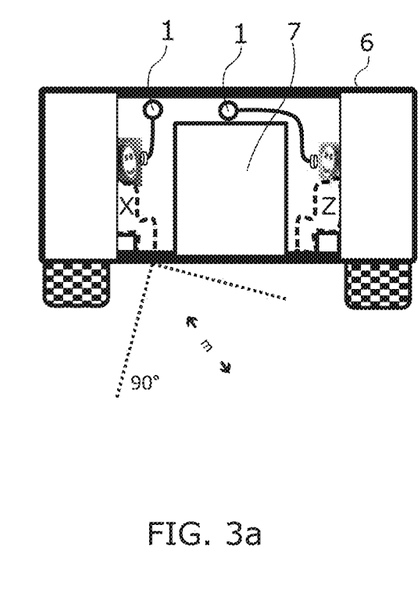
FIGS. 3a and 3b: Schematic depiction of the field of view from two different positions in the protected room.
Figure 3B:
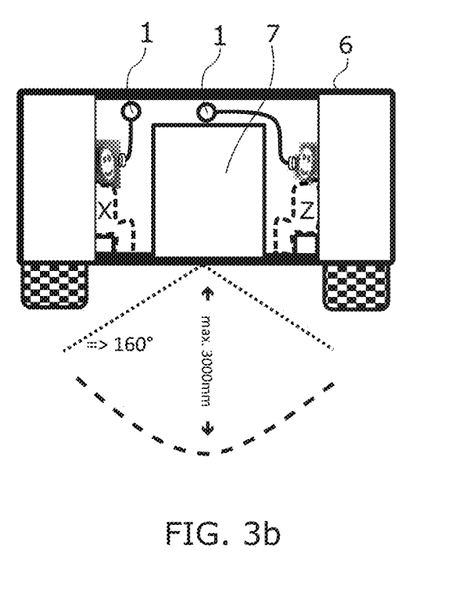

FIGS. 3a and 3b shows, by way of example and without restriction to the shown illustration, a vehicle 6 in which two observers X, Z are seated. A rear door 7 of the vehicle 6 is shown between the observers X, Z. Each of the observers X, Z uses a modular viewing device 1. The modular viewing devices 1 are designed such that they each covers one of the fields of vision shown in FIGS. 2a and 2b. In this example, the observer X surveys, by means of a modular viewing device 1, a field of view which covers 90° and whose main viewing direction runs diagonally to the rear door 7. By means of a further modular viewing device 1, observer Z surveys a field of view which covers up to 160° and whose main viewing direction runs perpendicular to the rear door 7.

Figure 4:
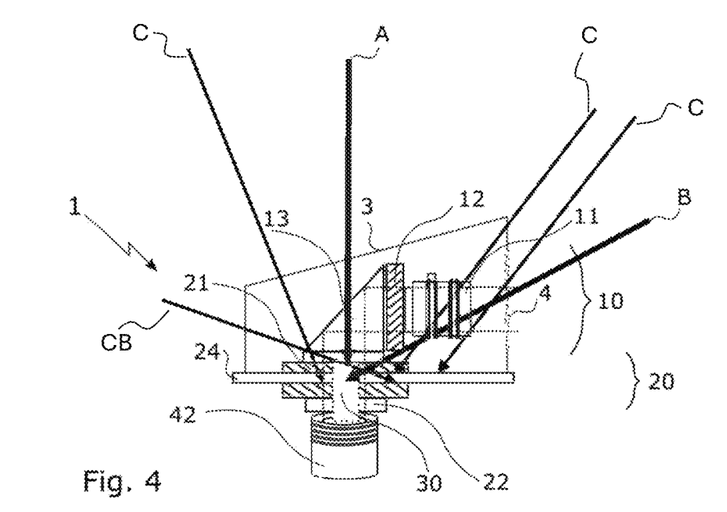
FIG. 4: Schematic depiction of the distal module and the connection unit.

FIG. 4 shows the distal module 10 and the connection unit 20 in a schematic view. In this view, the increase in safety is shown, in particular, the safety with respect to strongly accelerated objects, which can impinge on the viewing device in the directions marked as black arrows. Such strongly accelerated objects may be, for example, splinters, fragments or particles. The length of the wall element 24 of the connection unit 20 represents the width of a conventional periscope shaft in vehicles. Since such conventional periscopes usually require a lot of space due to the mirror arrangement and other parameters, conventional periscope housings are usually very wide, so that there is an increased risk that strongly accelerated objects, for example from directions A and B, penetrate the periscope housing and enter protected rooms arranged adjacent to the periscope housing.

In comparison to this, in the connection unit 20 according to the invention, a wall element 24 is provided, which is designed to be penetration-proof. Thus, the possible penetration space is limited to the image channel 30. The circumference of the image channel 30 is advantageously much smaller than an existing or conventional periscope shaft, so that in the example shown in FIG. 4 only the two objects A and B can penetrate or enter the protected interior of the room. In comparison, significantly more strongly accelerated objects C coming from the additional directions shown in FIG. 4, could penetrate into the protected room through a conventional periscope shaft. The risk of an observer being hit by one of these objects C within the protected room is therefore minimized. Because of this, it may be provided, that the modular viewing device 1, in particular the connection unit 20, can be installed, preferably with the wall element 24 on or in an existing periscope shaft, to convert the vehicle this way. In this case, a rigid lower housing of a conventional periscope that protrudes into the protected room is advantageously no longer required.

Figure 5:
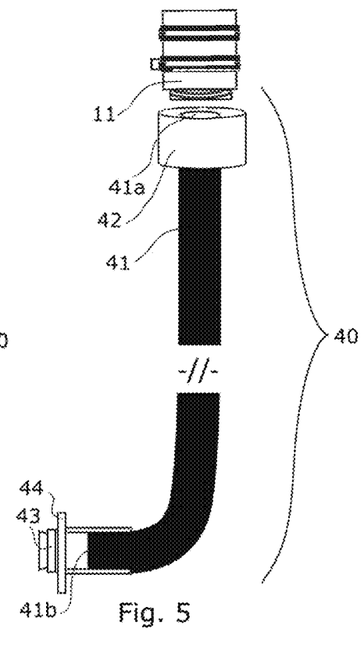
FIG. 5: Schematic depiction of the proximal module with a lens.

FIG. 5 shows the proximal module 40 in particular with a second coupling device 42, which is arranged at the entry end 41a. The coupling device 42 is designed such that the entry end 41a of the light guide 41 can be optically coupled to the lens 11, and preferably such that the coupling device 42 can be mechanically coupled to the lens 11, for example by means of a bayonet or screw connection. This way, the proximal module 40 is portable and can be taken outside by the observer, and in particular is usable in dismounted operation. It is therefore provided, that the proximal module 40 can be decoupled optically and mechanically, in particular completely, from the connection unit.

Figure 6:
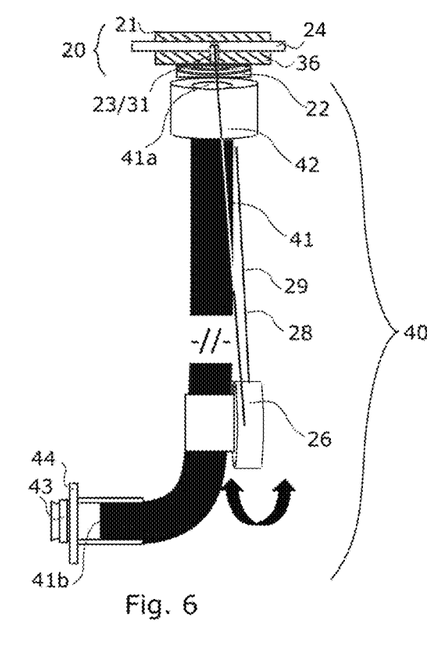
FIG. 6: Schematic depiction of the distal module and the connection unit.

According to FIG. 6, the proximal module 40 can on the other hand also be coupled optically and mechanically to the connection unit 20 instead of a being coupled to an objective lens 11. For this purpose, the first coupling device 22 of the connection unit 20 is capable of being mechanically coupled to the second coupling device 42 of the proximal module, for example by means of a bayonet or screw connection. Without being limited to the example shown, a device for mechanical articulation 23 comprises means for transmitting mechanical movements, for example in the form of a Bowden cable 29. The Bowden cable or flexible motion translator 28 of the Bowden cable 29, which for example, can be guided via idlers 31, can be connected to the rotatable bearing 21. The idlers 31 are preferably arranged on the wall element 24. The idlers 31 can, however, also be arranged on the rotatable bearing 21 or on a rotary element 36 of the rotatable bearing 21, which is assigned to the proximal module 20. This way, the device for mechanical articulation 23 remains connected to the connection unit 20, while the proximal module 40 is decoupled.

Figure 7:
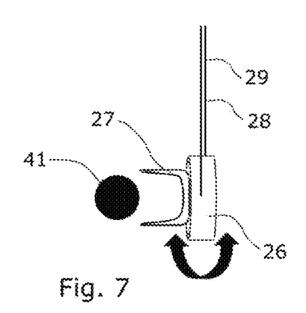
FIG. 7: Schematic representation of the operating unit.

Likewise, the operating unit 26, for example as shown in FIG. 7, can be mechanically connected to the light guide 41. An assembly device 27 is provided for this purpose. The assembly device 27 is preferably designed as a plug-in or clamping device, in particular so that the plug-in or clamping device can be clamped on the light guide 41 such that the assembly device 27 at least partially encompasses or surrounds the light guide 41. This way, the operating unit 26 may only be decoupled from the light guide 41 by hand movement, in particular without further tools or auxiliary means, so that a simple assembly is ensured. The operating unit 26 may preferably also be plugged or screwed onto the exit end 41b of the light guide 41.

Figure 8:
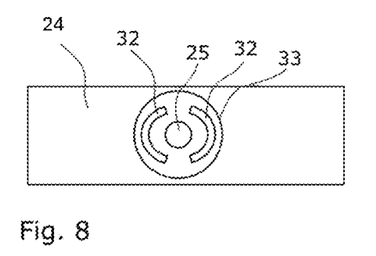
FIG. 8: Schematic depiction of the wall element.

FIG. 8 shows the wall or wall element 24 of the connection unit 20. The wall or wall element 24 of the connection unit 20, respectively, comprises the opening of the connection unit 25 as well as at least one, preferably two or more rotation limiters 32. The wall element 24 of the connection unit 20 may be designed as an inner metal partition plate with a cutout and in particular strongly inhibits acceleration of objects with high, strong impulses, so that an object coming from the vertical direction cannot penetrate the modular viewing device 1 and enter the vehicle interior, or be held from entering or leaving an impact protected or penetration protected room, respectively.

The rotation limiters 32 are preferably arranged around the opening 25 and in particular are designed at least partially circular. The rotation limiters 32 can be designed as recesses in the wall or in the wall element 24. The recesses or rotation limiters 32 are preferably arranged between the opening 25 and a ball groove 33. The ends of the rotation limiters 32 preferably serve as a stop for connectors 35, which may be guided in the rotation limiters 32. The ball groove 33 is designed such that preferably at least two or more, for example three, four or five balls 34 of the rotatable bearing 21 can be guided in the ball groove 33. Preferably, the ball groove 33 is arranged concentrically to or around the opening 25, so that the opening 25 cannot be covered by other elements in the event of a rotation and so that the image can be transmitted through the opening 25 without interference in case of a rotation.

Figure 9:
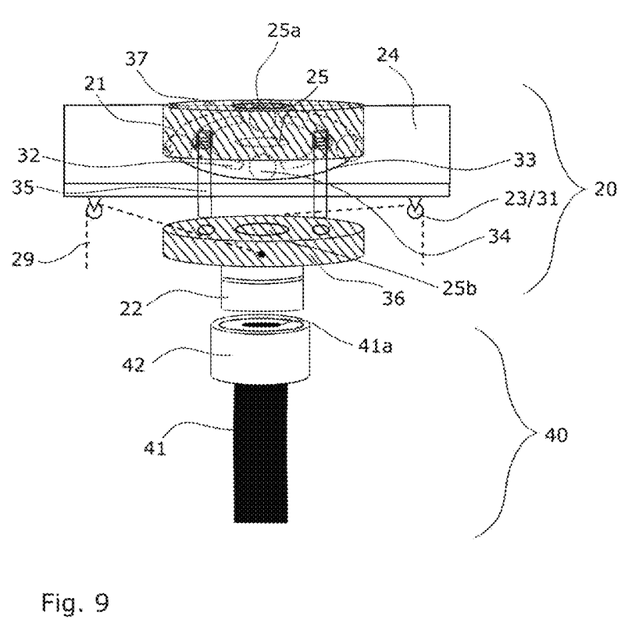
FIG. 9: Schematic depiction of the rotatable bearing.

In FIG. 9, the connection unit 20 with the rotatable bearing 21 is shown in detail. Accordingly, the rotatable bearing 21 is designed as a ball bearing and comprises at least two or more, for example, three, four or more balls 34 that are arranged in the ball groove 33 and, in particular, that can be guided. A rotary element 36 assigned to the proximal module 40 is preferably arranged on the side of the wall or wall element 24 facing the observer and/or is mechanically connected to a rotary element 37 assigned to the distal module 10 by means of at least two or more connectors 35, wherein the rotary element 37 assigned to the distal module 10 is preferably arranged on the side of the wall or wall element 24 facing away from the observer. Basically, the wall or wall element 24, the rotary element 37 assigned to the distal module 10 and the rotary element 36 assigned to the proximal module 40 are arranged such that the opening 25 as well as an opening 25a of the rotary element 37 assigned to the distal module 10 and an opening 25b of the rotary element 36 assigned to the proximal module 40 are arranged in particular concentrically on the optical axis.

At least one rotary element 36, 37 may be fixedly connected to the connector 35 or the connectors 35. Preferably, both rotary elements are mechanically fixed to the connectors 35, for example by means of gluing, screwing and/or welding. The balls 34 may essentially be arranged between the rotary element 37 assigned to the distal module 10 and the wall or wall element 24 such that the rotary element 37 assigned to the distal module 10 is guided by the balls 34 during rotation. It is also conceivable that the rotary element 36 assigned to the proximal module 40 is guided by balls during rotation. In this case, the wall or wall element 24 may comprise a ball groove 33 on the side facing the observer, wherein the balls 34 being arranged between the wall or wall element 24 and the rotary element 36 assigned to the proximal module 40.

Likewise, it is also possible that the rotary element 36, 37 assigned to the distal module 10 and/or the proximal module 40 also comprise a ball groove 33.

It is provided, that the connectors 35 are pin-shaped and/or are arranged so as to being passed through the wall 2 or the wall element 24 and preferably passed through the rotation limiters 32. In this case, at least one connector 35, preferably one connector 35 each, can be passed through, preferably one rotation limiter 32 each, or at least two connectors 35 may be passed through one rotation limiter 32. The connectors 35 may advantageously comprise a head, wherein this head preferably being provided to exert a pressure on at least one rotary element 36, 37, in particular a directed pressure in the direction of the opposite rotary element 36, 37, preferably so that the rotary element 37 assigned to the distal module 10 and the rotary element 36 assigned to the proximal module 40 can be pulled towards one another by the connector 35. In other words, the head of the connector 35 is larger in width or diameter than an opening of the rotary element through which the connector 35 is passed.

In order to be able to pass further flexible movement translators through the connection unit 20, for example a further Bowden cable 29, it is provided that the further flexible movement translators 28 are passed through at least the rotary element 37 assigned to the distal module 10, the rotary element 36 assigned to the proximal module 40 and/or, through the connector 35, in particular lengthwise. It is also provided, that the rotary element 36 assigned to the proximal module 40 comprises at least two in particular opposite fixpoints, with a flexible movement translator being arranged on each of which. Thereby, the first coupling device 22 may also be arranged, in particular fastened, on the rotary element 36 assigned to the proximal module 40.

Figure 10:
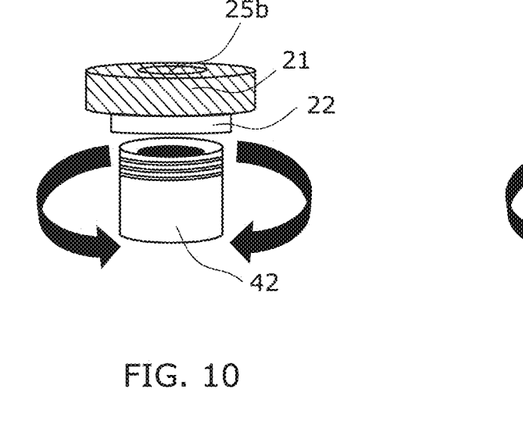
FIG. 10: Schematic depiction of the second coupling device.
Figure 11:
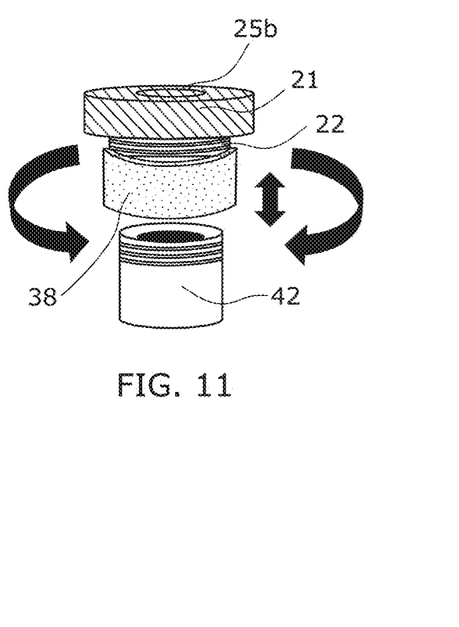
FIG. 11: Schematic depiction of the first and second coupling device.
Figure 12:
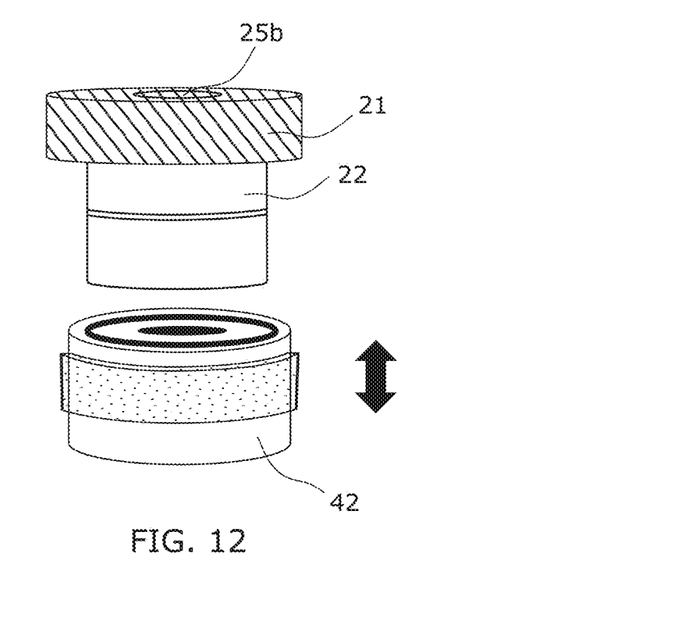
FIG. 12: Schematic depiction of the first and second coupling device.

In FIGS. 10 to 12, various embodiments of the mechanical coupling of the first coupling device 22 of the connection unit 20 to the second coupling device 42 of the proximal module 40 are shown by way of example and without being restricted to the examples shown. FIG. 10 accordingly shows, by way of example, a second coupling 42 device with a screw thread, in particular an external thread, preferably for screwing into an internal thread of the first coupling device 22. In this case, the first coupling device 22 is arranged on the rotatable bearing 21, which comprises the opening 25. However, it is also conceivable that the first coupling device comprises an external thread, which can be screwed into an internal thread of the second coupling device 42.

FIG. 11 shows that the first and preferably the second coupling device 22, 42 comprise a screw thread, in particular an external thread. In this example, the first and second coupling device 22, 42 may be screwed into an outer sleeve 38, preferably an outer sleeve with an internal thread. It may also be provided that the first and in particular, also the second coupling device 22, 42 comprise an internal thread, wherein the first and second coupling device 22, 42 can be screwed onto a common helical element, preferably with an external thread.

FIG. 12 shows the first and second coupling device 22, 42, which are designed as a bayonet system. The first or second coupling device 22, 42 may comprise a locking insert with a notch. The complementary second or first coupling device 22, 42 accordingly comprises a protrusion or pin, or a spring holder, which is designed to snap into the locking insert. According to the invention, the coupling devices 22, 42 may also comprise standardized quick coupling adapters.

LIST OF REFERENCE SIGNS

| | |
|---|---|
| 1 | modular viewing device |
| 2 | wall |
| 3 | housing |
| 4 | disk-shaped element |
| 5 | trapezoidal section |
| 6 | vehicle |
| 7 | rear door |

-continued

| | |
|---|---|
| 10 | distal module |
| 11 | objective lens |
| 12 | lens holder |
| 13 | light deflecting element |
| 20 | connection unit |
| 21 | rotatable bearing |
| 22 | first coupling device |
| 23 | device for a mechanical articulation |
| 24 | wall element |
| 25 | opening of the connection unit |
| 26 | operating unit |
| 27 | assembly device |
| 28 | flexible motion translator |
| 29 | Bowden cable |
| 30 | image channel |
| 31 | idlers |
| 32 | rotation limiter |
| 33 | ball groove |
| 34 | balls |
| 35 | connector |
| 36 | rotary element assigned to the proximal module |
| 37 | rotary element assigned to the distal module |
| 38 | outer sleeve |
| 40 | proximal module |
| 41 | movable light guide |
| 41a | entry end of the light guide |
| 41b | exit end of the light guide |
| 42 | second coupling device |
| 43 | eyepiece |
| 44 | assignment unit |
| A | direction A |
| B | direction B |
| X | observer X |
| Z | observer Z |

What is claimed is:

1. A modular viewing device for observation by an observer through a wall or wall element that separates a protected space from an unprotected space, the modular viewing device comprising:
a distal module with an objective lens;
a proximal module having a movable light guide, the movable light guide comprising a flexible fiber optic image guide having an entry end and an exit end;
a connection unit having a first coupling device, the first coupling device being configured for multiple times repeatably and manually releasable optical and mechanical coupling of the proximal module to the connection unit so that an image captured by the objective lens is directed to the entry end and is transmitted by the image guide to the exit end; and
a rotatable bearing that rotatably mounts the distal module on a side of the wall or wall element opposite to the proximal module so that the distal module is rotatable relative to the proximal module,
wherein the connection unit is mountable on the wall or wall element,
wherein the rotatable bearing comprises an articulation device configured to allow articulation of the rotatable bearing by the observer, and
wherein the first coupling device is selected from a group consisting of a bayonet system, a screw system, and a flange system.

2. The modular viewing device of claim 1, wherein the proximal module comprises a feature selected from a group consisting of:
a second coupling device configured to detachably couple the proximal module and the connection unit,
a second coupling device configured to detachably couple the proximal module and the objective lens,
an exchangeable eyepiece at the exit end,
the movable light guide being configured as a multi-part light guide having individual sections arranged in a row on an optical axis and being optically coupled to one another, an assignment unit configured to arrange the proximal module on an object portable by the user, and
an assignment unit configured to arrange the proximal module on an acquisition unit.

3. The modular viewing device of claim 1, wherein the distal module comprises a feature selected from a group consisting of:
a light deflecting element for optically coupling the image into the connection unit, a mirror element for optically coupling the image into the proximal module,
a pivoting and/or tilting device configured to pivot and/or tilt the objective lens,
a pivoting and/or tilting device configured to pivot and/or tilt a light deflecting element that optically couples the image into the connection unit,
a pivoting and/or tilting device configured to pivot and/or tilt a mirror element that optically couples the image into the proximal module,
a rotation device configured so that the distal module is arranged rotatable by an angle of at least 90°.

4. The modular viewing device of claim 1, wherein the connection unit comprises a feature selected from a group consisting of:
a first opening in the wall or wall element to optically couple the proximal module with the distal module, and
an optical element to optically couple the proximal module with the distal module.

5. The modular viewing device of claim 1, wherein the connection unit comprises an operating unit configured to remotely operate the rotatable bearing, and wherein the operating unit comprises an assembly device for connecting the operating unit to the movable light guide.

6. The modular viewing device of claim 1, wherein the articulation device comprises an operating unit arranged on the proximal module, the operating unit configured to operate the rotatable bearing.

7. The modular viewing device of claim 1, wherein the articulation device comprises at least one Bowden cable for the transmission and/or translation of mechanical movements.

8. The modular viewing device of claim 1, wherein the first coupling device is configured so that the movable light guide is rotatable independently of the first coupling device.

9. The modular viewing device of claim 1, wherein the first coupling device is configured so that the movable light guide is rotatable torsion-free.

10. The modular viewing device of claim 4, wherein the distal module is connected to the connection unit and the distal module is rotatably mounted with respect to the wall or wall element of the connection unit.

11. The modular viewing device of claim 1, wherein the distal module and the connection unit are attached the wall or wall element.

12. The modular viewing device of claim 1, wherein the modular viewing device is sized and configured as an optical conversion device for replacing a periscope or corner mirror insert of a vehicle.

13. The modular viewing device of claim 1, wherein the distal module is articulable with a range of motion selected from a group consisting of: a swivel range of up to 90°, a swivel range of up to 105°, a swivel range of up to 180°, an inclination range of up to ±30°, tiltable up to 25° upwards, tiltable up to 30° upwards, tiltable up to 10° downwards, tiltable up to 15° downwards.

14. The modular viewing device of claim 1, wherein the modular viewing device is sized and configured for observation through the wall or wall element selected from a group consisting of an industrial space, energy industry space, an aviation space, a shipping space, a manufacturing space, chemical generating space, an energy generating space, an armored vehicle space, an armored room or facility space.

15. A proximal module for a modular viewing device that allows for observation through a wall or wall element of a protected space, the proximal module comprising:
- a movable light guide comprising a flexible fiber optic image guide having an entry end and an exit end;
- an eyepiece at the exit end; and
- a coupling being configured to releasably couple the proximal module to the modular viewing device, wherein the coupling is selected from a group consisting of a bayonet system, a screw system, and a flange system.

16. A connection unit for a modular viewing device that allows for observation by an observer through a wall or wall element that separates a protected space from an unprotected space, the connection unit comprising:
- a first coupling device being configured for multiple times repeatably and manually releasable optical and mechanical coupling of a proximal module to the connection unit; and
- a rotatable bearing by which the distal module is mounted rotatably with respect to the proximal module, the rotatable bearing is arranged on the wall or wall element, wherein the rotatable bearing comprises an articulation device configured to allow articulation of the rotatable bearing by the observer.

* * * * *